United States Patent [19]

Frank et al.

[11] 3,791,812

[45] Feb. 12, 1974

[54] PROCESS FOR THE RECOVERY OF NON-FERROUS METAL VALUES FROM SULFIDE ORES AND THE REDUCTION OF GASEOUS EMISSIONS TO THE ATMOSPHERE THEREFROM

[75] Inventors: Robert L. Frank, Lake Geneva, Wis.; Sidney G. Martin; Clayton S. Smith, both of Crystal Lake, Ill.

[73] Assignee: Morton-Norwich Products, Inc., Chicago, Ill.

[22] Filed: Dec. 20, 1971

[21] Appl. No.: 210,081

[52] U.S. Cl. .................. 75/9, 75/72, 75/101 R, 75/113, 75/115, 423/27, 423/240, 423/242
[51] Int. Cl. ......... C22b 3/00, C01g 3/10, C01c 3/04
[58] Field of Search... 75/1, 7, 9, 113, 115, 72, 117, 75/101 R, 119

[56] References Cited
UNITED STATES PATENTS

| | | | |
|---|---|---|---|
| 1,870,863 | 8/1932 | Meyer | 75/113 |
| 1,898,701 | 2/1933 | Wescott | 75/113 X |
| 2,067,778 | 1/1937 | Mitchell | 75/113 X |
| 1,943,341 | 1/1934 | Mitchell | 75/113 |
| 2,772,153 | 11/1956 | West et al. | 75/9 |
| 2,889,203 | 6/1959 | Pfannmueller et al. | 75/1 X |
| 3,453,101 | 7/1969 | Takahashi et al. | 75/111 X |
| 3,186,833 | 6/1965 | Ceck | 75/113 X |

FOREIGN PATENTS OR APPLICATIONS

| | | | |
|---|---|---|---|
| 336,770 | 10/1930 | Great Britain | 75/115 |
| 222,638 | 7/1959 | Australia | 75/115 |
| 32-9251 | 12/1957 | Japan | 75/9 |
| 150,301 | 2/1953 | Australia | 75/9 |

Primary Examiner—A. B. Curtis

[57] ABSTRACT

A process for roasting an admixture of an inorganic chloride and a sulfide ore for subsequent extraction of substantially all of the copper, nickel, cobalt and manganese values of the ore as water soluble salts and for reducing the emission to the atmosphere of large quantities of sulfur dioxide and chlorine formed during said process without the necessity of using chemical absorbing solutions. The process comprises mixing the ore with an inorganic chloride such as sodium chloride, lithium chloride, potassium chloride, calcium chloride and magnesium chloride, providing the mixture in a gas permeable state to a first stage heating or roasting zone while maintaining therein from about 80 to about 140 percent of the stoichiometric quantity of air therein, conducting exhaust gases from the first stage heating zone to a second stage heating or roasting zone which contains roasted mixture from the first stage heating zone, replenishing the first stage roasting zone with fresh inorganic chloride-ore mixture, trapping exhaust gases from the second stage heating zone in water and leaching the roasted mixture from said second stage heating zone with water to extract substantially all of said metal values as water soluble salts. The process reduces the emission to the atmosphere of sulfur dioxide and of chlorine by at least about 85 percent, and upwards of 90 percent in preferred embodiments.

9 Claims, 4 Drawing Figures

FIG. 4 EFFECT OF SALT CONCENTRATION ON $SO_2$ LOSS
REACTOR 1 AT 350°C
REACTOR 2 AT 350°C
BED 2 : BED 1 = 2:1
SINGLE ROAST CYCLE
AIR ABOUT 120% OF STOICHIOMETRIC

PROCESS FOR THE RECOVERY OF NON-FERROUS METAL VALUES FROM SULFIDE ORES AND THE REDUCTION OF GASEOUS EMISSIONS TO THE ATMOSPHERE THEREFROM

BACKGROUND OF THE INVENTION

1. Field of the Invention

There is a continuing and increasing need in a complex industrial society for the development of efficient and economical methods for the extraction of metal values from ores. With the increasing awareness of the various sources of air pollution and the necessity of devising means to reduce or eliminate air pollution from these sources, the development of non-polluting, efficient and economical methods for the extraction of non-ferrous metal values from their ores is mandatory. The unique properties of copper, nickel, cobalt and manganese, and the use of these metals and their salts in the fields of electrical and electronic components, metallurgy, dyes, medicine, and in the chemical industry in general, dictate that the supply of these important metals be assured by methods which do not add noxious gases to the ever increasing pollution of the atmosphere. The present invention provides a method for the extraction of these metals as water soluble salts from sulfide ores in which they occur by a simple and efficient process which significantly reduces and virtually eliminates the emission of sulfur dioxide usually associated with the processing of sulfide type ores.

2. Description of the Prior Art

Conventional metal recovering processes generally involve the steps of mining an ore, crushing and grinding, flotation and smelting. In the instance where sulfide ores are employed, the smelting or roasting operation yields large volumes of sulfur dioxide. A number of variations or alternates to the smelting step have been practiced and described in the literature. The main objective of substantially all of these methods has been the improved recovery of the metal values and not the elimination or reduction of the evolution of polluting sulfur dioxide.

A number of important metals are most commonly recovered from pyritic or sulfide ores. For example, the sulfide ores, chalcocite, $Cu_2S$; chalcopyrite, $CuFeS_2$; covellite, $CuS$; and copper-bearing pyrite, $FeS_2$, furnish the bulk of the world's copper supply. Likewise, substantial quantities of nickel are recovered from nickeliferrous pyrrhotite. Copper, cobalt and nickel have been recovered from pyrite deposits found in Pennsylvania. Large quantities of copper (and zinc) and important amounts of cobalt and other metals are obtained in Germany from iron pyrite clinker formed during sulfuric acid manufacture. Large deposits of sulfide ores exist throughout the world and will certainly continue to be of major importance in the future.

One serious disadvantage inherent in the use of sulfide ores is that huge quantities of sulfur dioxide are formed during the conventional roasting or smelting process. In the past these emissions have been largely uncontrolled for economic reasons and because their deleterious ecological effect was not fully understood. Present and future environmental considerations require that such emissions be eliminated, or at least greatly reduced. Legislation has been enacted in a number of States severely restricting the level of sulfur dioxide and other gaseous emissions to the atmosphere. In other States, such legislation is under consideration. As is obvious, such limitations on gaseous emissions present formidable technological and economic challenges to the chemical industry in general and to the ore refining industry in particular.

The current practice used to eliminate a portion of the sulfur dioxide emissions from sulfide ore smelting operations is to convert $SO_2$ to sulfuric acid. This approach is effective to a degree but is limited by several major factors. First, there are the economic factors involved in producing sulfuric acid. Many smelters are located a great distance away from large markets for sulfuric acid. In addition, it is unlikely that a large smelter could find markets for all of the sulfuric acid it could produce. Second, there are difficult technical problems to solve in efficiently converting the $SO_2$ in stack gases to sulfuric acid. For example, smelter dust, catalyst deactivation, low $SO_2$ concentrations and other considerations all are detrimental in producing sulfuric acid in this manner. Thus, while most smelters now in operation do convert some of their waste $SO_2$ to sulfuric acid, this does not appear to be a satisfactory solution for removing all of the $SO_2$.

Another method in limited use for the elimination of $SO_2$ emissions to the atmosphere involves the absorption and removal of $SO_2$ from the exhaust gases. However, because of the relatively low solubility of $SO_2$ in water, this requires the use of chemical absorbents such as, for example, caustic solutions, lime water, or activated carbon. The literature is replete with many such attempts at $SO_2$ absorption, none of which has proven satisfactory. This is generally due to high costs, the logistics of handling large quantities of chemicals and the low value and disposal problem of the resulting by-products.

Roasting of sulfide ores, particularly copper ores, with salt (sodium chloride) to produce copper chloride has been practiced since the sixteenth century for the purpose of increasing the recoveries of the metal values. The following equation typifies the reaction which occurs when chalcopyrite ($CuFeS_2$), for example, is roasted with salt:

$$CuFeS_2 + 2NaCl + 3\tfrac{1}{2} O_2 \rightarrow Na_2SO_4 + CuCl_2 + FeO + SO_2$$

As is seen from the equation, substantial quantities of $SO_2$ are evolved. Another ore-salt roasting process comprises first roasting the sulfide ore to convert it to the oxide, and then contacting the oxidized ore with a solution containing sulfur dioxide and sodium chloride to form a water soluble complex. Here again there is considerable evolution of sulfur dioxide. In another process, known as the Segregation Process, a copper sulfide ore is first roasted to convert it to the oxide. The roasted ore is admixed with sodium chloride and finely ground coal and then subjected to further roasting to provide metallic copper. As with the other processes, substantial quantities of $SO_2$ are evolved.

Accordingly, it would be desirable to provide a roasting process for the recovery of substantially all of the important non-ferrous metal values, e.g., copper, nickel, cobalt and manganese, from sulfide ores bearing these metals by a procedure which is simple and efficient and which virtually eliminates or reduces significantly the emission of noxious gases to the atmosphere. It is therefore an object of the present invention to provide a process for extraction of substantially all of said metal values of sulfide ores by means which virtually eliminate or significantly reduce the evolution of sulfur dioxide. It is another object of this invention to provide a roasting process for the extraction of copper, nickel, cobalt and manganese from sulfide ores bearing these metals by means which virtually eliminate or significantly reduce the emission of sulfur dioxide, and which means obviate the use of chemical absorbing solutions.

The fulfillment of these and other related objects of this invention may be readily appreciated by reference to the following specification, examples, and appended claims.

SUMMARY OF THE INVENTION

Broadly, the present invention provides a process for roasting an admixture of an inorganic chloride and a sulfide ore for subsequent extraction therefrom as water soluble salts substantially all the copper, nickel, cobalt and manganese values therein and for reducing the emission to the atmosphere of sulfur dioxide and chlorine formed during said process without the necessity of using chemical absorbing solutions, said process comprising:

I. admixing a sulfide ore bearing said metal values with an inorganic chloride selected from the group consisting of sodium chloride, lithium chloride, potassium chloride, calcium chloride and magnesium chloride to form a mixture containing from about 30 to about 93 weight percent of ore and from about 70 to about 7 weight percent of inorganic chloride;

II. providing a charge of said mixture in a gas permeable state to a first stage roasting zone maintained at a temperature of from about 300°C. to about 425°C. and provided with from about 80 to about 140 percent of the stoichiometric quantity of air required to react with said mixture;

III. conducting roasted mixture from said first stage roasting zone to a second stage roasting zone in which the temperature is maintained at from about 300°C. to about 425°C. while replenishing the first stage roasting zone with a fresh charge of said inorganic chloride-sulfide ore admixture;

IV. conducting exhaust gases from said first stage roasting zone to said second stage roasting zone;

V. trapping exhaust gases from said second stage roasting zone in water to form an aqueous solution of sulfuric and hydrochloric acids; and VI. leaching the roasted mixture from said second stage roasting zone with water to extract therefrom substantially all of said metal values as water soluble salts.

Alternately, the process may be described as one for recovering metal values from sulfide ores which comprises:

I. roasting in a first roasting zone a gas permeable admixture of from about 30 to about 93 percent of a sulfide ore containing a metal selected from the group consisting of copper, nickel, cobalt and manganese, and from about 7 to about 70 percent of an inorganic chloride selected from the group consisting of sodium chloride, potassium chloride, lithium chloride and magnesium chloride at a temperature of from about 300°C. to the fusion point of said admixture while subjecting said admixture to flow of air in sufficient volume to provide from about 80 to about 140 percent of the stoichiometric quantity of oxygen required to react with said admixture to oxidize same;

II. removing and passing a portion of the roasted solids from said first roasting zone to a second roasting zone maintained at a temperature of from about 300°C. to the fusion point of said roasted admixture;

III. conducting effluent gases from the first roasting zone to the second roasting zone and passing said gases through the roasted admixture contained therein;

IV. recovering and removing effluent gases from the second roasting zone and trapping said gases in water to form a solution of sulfuric and hydrochloric acids; and V. removing solid roasted mixture from said second roasting zone and leaching said roasted mixture with water to recover therefrom substantially all of said metal values.

DESCRIPTION OF DRAWING

There is shown in

DETAILED DESCRIPTION

Exemplary of the sulfide ores which may be utilized in the present process are the chalcopyrites, the chalcocites, the nickel-ferrous pyrrhotites, and the various sulfide ores bearing cobalt and manganese values. The present process operable with both high grade and low grade ores. For example, excellent copper recoveries and significant $SO_2$ $Cl_2$ emission reductions are obtained with either a high grade copper ore having a 26 percent Cu content, or with a low grade copper ore having a 1.8 percent Cu content.

The inorganic chlorides sodium chloride, lithium chloride, potassium chloride, calcium chloride and magnesium chloride are operable in the process of this invention, although the yields of water soluble metal salts are reduced in the instance where lithium chloride and potassium chloride are employed. Sodium chloride is preferred and the present process will be described with reference thereto. The use of sodium chloride in admixture with the ore is an important step in this process and markedly increases the yield of water soluble metal values provided the other parameters of the process are observed.

Figure 4:
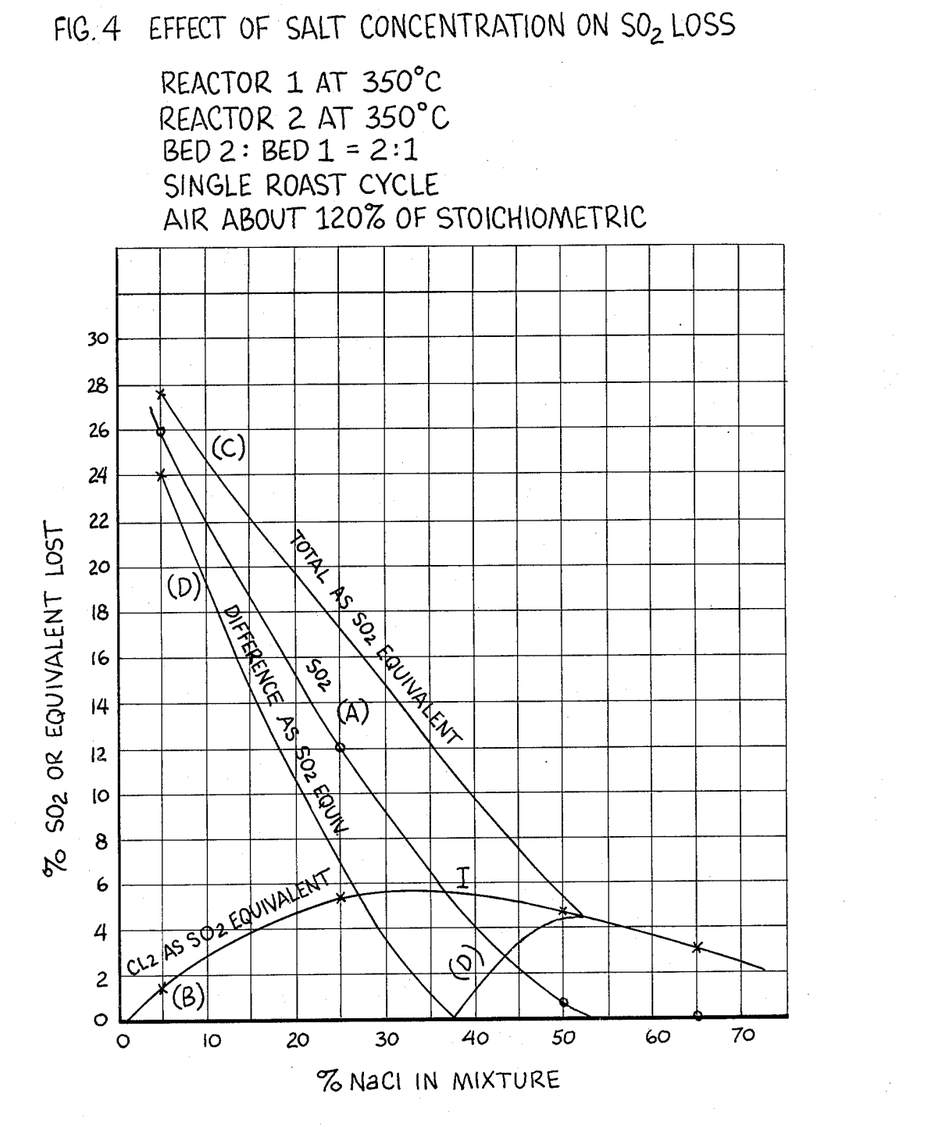
FIG. 4, hereinafter discussed more fully, is a graph depicting the effect of NaCl concentration on $SO_2$ and $Cl_2$ emission when the ore employed is a high grade copper ore containing 26 percent Cu.

In the two-stage roasting zone procedure of the present invention a concentration from about 7 to about 70 weight percent of sodium chloride in admixture with from about 93 to about 30 percent by weight of ore is operable to reduce gaseous emissions, particularly sulfur dioxide, by at least about 85 percent of the total sulfur available, and upwards of 90 percent in preferred embodiments of this process. A preferred concentration is from about 25 to about 50 percent by weight of sodium chloride in the ore-NaCl mixture. At this concentration of sodium chloride the net emission to the atmosphere of either $SO_2$ or $Cl_2$ is only about 5 percent or less of the total sulfur and chloride available, which represents a reduction in emission of about 95 percent or more. This is demonstrated by the graph of FIG. 4 in which the percent NaCl in the ore-NaCl mixture is plotted along the abscissa and the percent $SO_2$ evolved is plotted along the ordinate. The results depicted in FIG. 4 are based on Examples 20-24 and are more fully explained in the discussion relating to said examples.

The ore-sodium chloride mixture of this invention is provided in a gas permeable state. One convenient method is by a fluidized bed technique by which a stream of air is passed upwardly through a bed of the ore-sodium chloride mixture to maintain the solids in turbulent and agitated condition, using conventional and well known fluidized bed apparatus and techniques. An alternate procedure is to form porous pellets of the ore-sodium chloride admixture by moistening the admixture with water, forming agglomerates thereof and thereafter drying the agglomerates. These agglomerates may be used either under fluid bed conditions or in a conventional roasting procedure. As is evident, the admixture in the form of porous pellets affords easy access therethrough to air and gases which are present in the roasting zones and are required for reaction with the admixture. In the absence of a gas permeable physical state of the admixture, the yield of water soluble metal salts is markedly decreased.

The present process provides for a two-stage roasting zone procedure. A charge of the ore-sodium chloride admixture in a gas permeable state which may be achieved by either the formation of a fluidized bed or by the provision of porous pellets, is heated in a first stage roasting zone maintained at a temperature of from about 300°C. to about 425°C. The exhaust gases containing $SO_2$ from the first stage roasting zone are conducted to the second stage roasting zone which is charged with fully roasted admixture from the first stage roasting zone. The first stage roasting zone is replenished with a fresh charge of ore-sodium chloride mixture. In the second stage roasting zone, the $SO_2$ functions to convert the oxides formed in the first stage roasting zone to water soluble sulfates. Some water soluble metal chlorides are also formed by reaction with sodium chloride and/or chlorine. The temperature of the second stage roasting zone is also maintained at from about 300°C. to about 425°C. Thus, by the use of at least a two-stage heating (roasting) procedure in which the exhaust gases from the first stage are utilized for reaction with the roasted mixture from the first stage, it is possible to reduce or virtually eliminate the discharge of $SO_2$ and $Cl_2$ to the atmosphere. It is of course understood that the present process, which is described in terms of a two-stage heating zone batch process, may be carried out as a continuous process by the use of well known techniques therefor. It is also possible to utilize more than two heating zones, if desired. However, this is not necessary when the present procedure is carried out properly and the various parameters of the process are controlled as indicated.

In practice it is found convenient to mount the first stage heating zone (furnace No. 1) horizontally and to connect the exit end thereof to the inlet end of the second stage heating zone (furnace No. 2) which is mounted vertically. Thus, exhaust gases from furnace No. 1 are passed into the inlet end of furnace No. 2 and up through the roasted mixture (from furnace No. 1) contained therein, thereby effecting complete contact and reaction between the gases ($SO_2$, $Cl_2$ and $O_2$) and the mixture.

The practical lower limit on the reaction temperature is about 300°C. The practical upper limit on the reaction temperature is determined by the temperature at which fusion of the solid mixture occurs. Generally, temperatures above about 450°C. cause fusion of the mixture and thereby significantly reduce its gas permeability. The theoretical temperature upper limit is that temperature at which significant quantities of copper chlorides begin to volatilize. This temperature is in the neighborhood of about 500°C. The best operating temperature is of course related to and coordinated with the other variables of the present process, i.e., the proportion of sodium chloride used, the quantity of air ($O_2$), and the efficiency of contact between the air-sodium chloride admixture and the air supply and other gases evolved during the process ($SO_2$ and $Cl_2$). However, the optimum operating temperatures range from about 325°C. to about 425°C. or 450°C.

The conversion of the metal value of the sulfide ores employed in the present invention to water soluble salts involves chemical reactions which require the presence of oxygen. This is provided by air, and the references hereinafter to air are understood to mean and include oxygen. The quantity of air employed is that amount which is required to supply sufficient oxygen to the reaction to oxidize all of the sulfur in the ore to the sulfate ion. The air requirement in the instance of chalcopyrite ore is based on the following reaction:

$$CuFeS_2 + 4O_2 \rightarrow CuSO_4 + FeSO_4$$

An air supply varying from about 80 percent to about 140 percent of the stoichiometric quantity required is operable in the present process. A preferred air supply range is from about 120 to about 140 percent of the stoichiometric quantity required. The excess over the stoichiometric quantity provides for conversion of metal values such as iron, for example, to the oxide and also insures that an adequate supply of air is present in the instance where some of the air passes through the ore-NaCl admixture without reacting therewith.

As previously indicated, the primary objective of this invention is to reduce significantly the emission to the atmosphere of gaseous pollutants which are ordinarily formed in the roasting of ore. The principal gases evolved by the practice of the present process are $SO_2$ and $Cl_2$. By concatenating the proportions of sodium chloride, the temperature at which roasting is conducted in a two-stage roasting procedure, the utilization of the effluent gases from the first stage roasting zone as reactants in the second stage roasting zone, and the control of the air supply to the first stage roasting zone, the evolution of $SO_2$ and $Cl_2$ occurs in virtually equimolar quantities. This makes it possible to scrub these gases or absorb them in water where they react almost instantaneously to form sulfuric and hydrochloric acids, thereby obviating their emission to the atmosphere. This reaction is noted in the literature and is here taken advantage of to obviate the need for chemical absorbing solutions containing caustic, or lime water or the various other chemicals traditionally used for this purpose. The aqueous mixture of sulfuric and hydrochloric acids formed in the process of the present invention can be used in the hydrometallurgical processing of oxide type ores, or in other chemical processes requiring an acid medium.

The ratio of the quantity of ore-sodium chloride mixture in the second stage roasting zone to that of the first stage roasting zone is preferably greater than 1. It is desirable to have a quantity of roasted mixture in the second stage roasting zone which is greater than the quantity of fresh charge in the first stage roasting zone since this affords a more efficient conversion of the metal values to water soluble sulfates and chlorides due to the reaction of the effluent gases from the first stage roasting zone with the roasted mixture.

It has been found that the process of this invention enables the aqueous leaching of the roasted ore-sodium chloride mixture to recover substantially all the metal value content of the ore, i.e., at least about 90 percent thereof, while reducing the gaseous emissions to the atmosphere by at least about 85 percent, and in many instances to over 90 percent. One convenient method to accomplish the water extraction of the metal values is by slurrying the roasted mixture in water and thereafter filtering the slurry to separate the water soluble salts therefrom.

In one preferred form the present invention provides a process for roasting an admixture of sodium chloride and a copper bearing sulfide ore for subsequent extraction therefrom as a water soluble salt substantially all of the copper value therein and for reducing the emission to the atmosphere of sulfur dioxide and chlorine formed during said process without the necessity of using chemical absorbing or chemical gas scrubbing solutions, said process comprising:

I. admixing from about 30 to about 93 weight percent of a copper-bearing sulfide ore with from about 70 to about 7 weight percent of sodium chloride to form an ore-sodium chloride mixture;

II. agglomerating said mixture to form porous pellets thereof;

III. heating a charge of said porous pellets in a first stage roasting zone at a temperature of from about 300°C. to about 425°C., said zone being provided with from about 80 to about 140 percent of the stoichiometric quantity of air required to react with said mixture;

IV. conducting roasted pellets from said first stage roasting zone to a second stage roasting zone in which the temperature is maintained at from about 300°C. to about 425°C., while replenishing the first stage roasting zone with a fresh charge of said sodium chloride-sulfide ore admixture;

V. conducting exhaust gases from said first stage roasting zone to said second stage roasting zone containing roasted mixture from said first stage roasting zone;

VI. trapping exhaust gases from said second stage roasting zone in water to form an aqueous solution of sulfuric and hydrochloric acids; and VII. leaching the roasted pellets from said second stage roasting zone with water to extract therefrom substantially all the copper value as a water soluble salt.

For a more complete understanding of the present invention, reference is now made to the following specific examples illustrating the novel process of this invention.

DESCRIPTION OF THE PREFERRED EMBODIMENTS

EXAMPLE 1

A chalcopyrite ore concentrate assaying about 26 percent by weight of copper was roasted in a crucible at a temperature of 425°C. for 1 ½ hours in an open furnace under convective air flow. After roasting, the ore was leached with water and the leachings were analyzed for copper content. Result – 46.4 percent water soluble copper.

EXAMPLE 2

The process of Example 1 was repeated with the exception that 1.5 percent by weight of sodium chloride was admixed with the ore prior to roasting. Result - 82.9 percent water soluble copper.

EXAMPLE 3

The process of Example 1 was repeated with the exception that 3.1 percent by weight of sodium chloride was admixed with the ore prior to roasting. Result - 89.0 percent water soluble copper.

EXAMPLE 4

The process of Example 1 was repeated with the exception that 6.3 percent by weight of sodium chloride was admixed with the ore prior to roasting. Result 90.0 percent water soluble copper.

EXAMPLE 5

The process of Example 1 was repeated with the exception that 4.7 percent by weight of sodium chloride was admixed with the ore prior to roasting. The admixture was roasted in a Vycor tube at 370°C. and the $SO_2$ evolved was determined. Results - 80.6 percent water soluble copper. Sulfur (as $SO_2$) evolved 56.0 percent.

EXAMPLE 6

The process of Example 5 was repeated with the exception that 16.4 percent by weight of sodium chloride was admixed with the ore prior to roasting. Results - 96.8 percent water soluble copper. Sulfur (as $SO_2$) evolved 45.5 percent.

The results of Examples 1–6 are summarized in Table 1.

TABLE I

| Example | % NaCl | % Water Soluble Copper | % Sulfur (as $SO_2$) Evolved |
|---|---|---|---|
| 1 | 0 | 46.4 | * |
| 2 | 1.5 | 82.9 | * |
| 3 | 3.1 | 89.0 | * |
| 4 | 6.3 | 90.0 | * |
| 5 | 4.7 | 80.6 | 56.0 |
| 6 | 16.4 | 96.8 | 45.5 |

\* - Sulfur (as $SO_2$) evolved approximates about 60% of total available sulfur.

The results of Examples 1–6 employing a single stage roasting zone demonstrate that (1) the use of a relatively small proportion of sodium chloride in admixture with the ore results in markedly increased copper recoveries (compare Example 1 with Example 2), and (2) in all instances there is an unacceptably high emission of sulfur dioxide, ranging from about 45 to about 60 percent of the available sulfur.

EXAMPLE 7

Two-Stage Roasting Zone Procedure

A mixture containing 40 grams of chalcopyrite ore (26% Cu content) and 40 grams of sodium chloride was moistened with water, formed into agglomerates and dried to form porous pellets of which sodium chloride comprised 50 percent and copper 13.2 percent of the entire mixture. The porous pellets were placed in a Vycor glass tube approximately 30 inches long. The flow of air was set to yield about 120 percent of the stoichiometric quantity required and the Vycor tube was placed in furnace No. 1 which was preheated to a temperature of about 350°C. The exit end of the glass tube was left open to the atmosphere and the mixture was roasted for about 24 hours. After roasting, the glass tube was removed from the furnace and allowed to cool.

The roasted mixture was then charged into a second Vycor tube and placed in furnace No. 2 which was mounted in a vertical position and preheated to a temperature of about 400°–410°C. A fresh charge of 20 grams of the same ore-NaCl mixture was placed in the first Vycor tube and inserted into furnace No. 1. The exit end of furnace No. 1 was connected to the inlet end of furnace No. 2 so that gases emitted from furnace No. 1 during the roasting of the mixture were passed directly into furnace No. 2 for reaction with the contents thereof. The exhaust or outlet end of furnace No. 2 was connected to a gas dispersion tube which was submerged in a scrubber (absorbing) solution consisting of half normal sodium hydroxide which is capable of absorbing the total $SO_2$ and $Cl_2$ evolved. After a second roasting of 24 hours, the mixtures of furnaces No. 1 and No. 2 were removed and allowed to cool. Twenty grams of the 80 gram mixture from furnace No. 2 were removed and extracted with water for the removal of water soluble copper salts therefrom. The water leachings were analyzed for copper content. The scrubber solution was oxidized with $H_2O_2$ and analyzed for sulfate and chloride content.

Results

Water soluble Cu — 95.9 percent
Total Sulfur as $SO_2$ — 1.1 percent
Total Chloride as $Cl_2$ — 5.4 percent * (* - Calculation - No. moles $Cl_2$ evolved/Total moles $SO_2$ available × 100 This expression defines $Cl_2$ as $SO_2$ equivalent.)
Net emission to air after water scrub (difference between $SO_2$ and $Cl_2$) — 4.3% $Cl_2$.

This represents the net gaseous emission to the atmosphere if the total $SO_2$ and $Cl_2$ were absorbed in water.

% Reduction in gaseous emission — 95.7 percent
The remaining 60 grams of charge mixture from furnace No. 2 were combined with the roasted 20 grams from furnace No. 1 to provide a new charge for furnace No. 2. A fresh 20 gram charge of the same 50 percent chalcopyrite ore - 50 percent sodium chloride mixture was then placed in furnace No. 1 as before to begin another roasting cycle.

EXAMPLE 8

The procedure of Example 7 was repeated except that the temperature of furnace No. 1 was 400°C. and the air supply thereto was 129 percent of the stoichiometric quantity required instead of 120 percent.

Results

Water soluble Cu — 96.8 percent
Total Sulfur as $SO_2$ — 0.1 percent
Total Chloride as $Cl_2$ — 10.3 percent
Net emission to air after water scrub (difference between $SO_2$ and $Cl_2$) — 10.2 percent
% Reduction in gaseous emission — 89.8 percent

EXAMPLE 9

The procedure of Example 7 was repeated except that the air supply was 143 percent of the stoichiometric quantity required instead of 120 percent.

Results

Water soluble Cu — 98.4 percent
Total Sulfur as $SO_2$ — 1.1 percent
Total Chloride as $Cl_2$ — 13.9 percent
Net emission to air after water scrub (difference between $SO_2$ and $Cl_2$) — 12.8% $Cl_2$
% Reduction in gaseous emission — 87.2 percent

EXAMPLE 10

The procedure of Example 7 was repeated except that the air supply was 178 percent of the stoichiometric quantity required instead of 120 percent.

Results

Water soluble Cu — 95.7 percent
Total Sulfur as $SO_2$ — 2.2 percent
Total Chloride as $Cl_2$ — 31.2 percent
Net emission to air after water scrub (difference between $SO_2$ and $Cl_2$) — 29.0% $Cl_2$
% Reduction in gaseous emission — 71.0 percent

EXAMPLE 11

The procedure of Example 7 was repeated except that the air supply was 214 percent of the stoichiometric quantity required instead of 120 percent.

Results

Water soluble Cu — 95.1 percent
Total Sulfur as $SO_2$ — 2.2 percent
Total Chloride as $CL_2$ — 22.9 percent
Net emission to air after water scrub (difference between $SO_2$ and $Cl_2$) — 20.7% $Cl_2$
% Reduction in gaseous emission — 79.3 percent A tabulation of these results is set forth in Table 2.

TABLE 2

CONDITIONS:
Furnace No. 1 — Temperature 350°C.
Furnace No. 2 — Temperature 400 – 410°C.
Charge Ratio Furnace No. 2: Furnace No. 1 - 4:1
Roast Time — 24 Hours

| Example | Air Supply As % Of Stoichiometric | % Cu Extracted By Water Leach | % $SO_2$ Evolved From Furnace No. 2 | % $Cl_2$ Evolved From Furnace No. 2 | % Net Emission To Atmosphere After Water Scrub ** | % Reduction In Gaseous Emission |
|---|---|---|---|---|---|---|
| 7 | 120 | 95.9 | 1.1 | 5.4 | −4.3 | 95.7 |
| 8 * | 129 | 96.8 | 0.1 | 10.3 | −10.2 | 89.8 |
| 9 | 143 | 98.4 | 1.1 | 13.9 | −12.8 | 87.2 |
| 10 | 178 | 95.7 | 2.2 | 31.2 | −29.0 | 71.0 |
| 11 | 214 | 95.1 | 2.2 | 22.9 | −20.7 | 79.3 |

* Furnace No. 1 — 400°C.
** Positive sign is net $SO_2$, negative is $Cl_2$.

It is evident that after several cycles the procedure of Example 7 approximates the operating conditions that would be encountered in a continuous process in which a roasting furnace (furnace No. 1) and an $SO_2$ fixing furnace (furnace No. 2) are operated in series with cocurrent, continuous flow of gas and solid phases. Of course, the charges to each furnace can be varied so that 1:1, 2:1, 4:1 or other ratios of furnace No. 2: furnace No. 1 charge volumes can be employed.

The foregoing examples illustrate that by the practice of the present invention it is possible to attain an operating condition whereby essentially no $SO_2$ is evolved, whereas comparable prior art process involving the roasting of sulfide ores cause emissions of from about 50 to 100 percent of the total available sulfur as $SO_2$. It is noted that the percent reduction in gaseous emissions ranges from 95.7 percent for an air supply of 120 percent of stoichiometric to 71.0 percent and 79.3 percent for air supplies of 178 percent and 214 percent of stoichiometric. If it is arbitrarily assumed that a reduction in gaseous emission of at least about 85 percent is a significant ecological contribution in the roasting of ores, then it is apparent that an air supply up to about 145 percent of stoichiometric is effective in the present process to produce that result. It is further noted that chlorine emissions, calculated as $SO_2$ equivalents, are of a low order of magnitude when the air supply is maintained at less than about 140 percent of the total required.

EXAMPLE 12

The procedure of Example 7 was followed except that the temperature of both furnace No. 1 and of furnace No. 2 was set at 365° – 375°C., and the charge of fresh ore-sodium chloride admixture which was placed in the first Vycor tube and inserted into furnace No. 1 after the original contents of the first Vycor tube were transferred to the second Vycor tube was 40 grams instead of 20 grams, making the charge ratio of the contents of furnace No. 2 to that of furnace No. 1 2:1 instead of 4:1.
Results
Water soluble Cu — 96.4 percent
Total Sulfur as $SO_2$ — 12.6 percent
Total Chloride as $Cl_2$ — 14.8 percent
Net emission to air after water scrub — 2.2 percent $Cl_2$
% Reduction in gaseous emission — 97.8 percent

EXAMPLE 13

The procedure of Example 12 was repeated to corroborate the results thereof.
Results
Water soluble Cu — 95.7
Total Sulfur as $SO_2$ — 14.3 percent
Total Chloride as $Cl_2$ — 9.7 percent
Net emission to air after water scrub — 4.6% $SO_2$
% Reduction in gaseous emission — 95.4 percent

EXAMPLE 14

The procedure of Example 12 was repeated except that the air supply was 100 percent of stoichiometric instead of 120 percent, and the time of roasting was 20 hours instead of 24 hours.
Results
Water soluble Cu — 95.3 percent
Total Sulfur as $SO_2$ — 12.6 percent
Total Chlorine as $Cl_2$ — 8.0 percent
Net emission to air after water scrub — 4.6% $SO_2$
% Reduction in gaseous emission — 95.4%

EXAMPLE 15

The procedure of Example 12 was repeated except that the air supply was 80 percent instead of 120 percent of stoichiometric, and the time of roasting was 16 hours instead of 24 hours.
Results
Water soluble Cu — 94.5 percent
Total Sulfur as $SO_2$ — 15.6 percent
Total Chloride as $Cl_2$ — 4.7 percent
Net emission to air after water scrub — 10.8% $SO_2$
% Reduction in gaseous emission — 89.1 percent

EXAMPLES 16 and 17

The procedure of Example 12 was repeated twice successively.

| Results | Example 16 | Example 17 |
|---|---|---|
| Water soluble Cu | 90.0% | 98.5% |
| Total Sulfur as $SO_2$ | 17.9% | 19.0% |
| Total Chloride as $Cl_2$ | 9.3% | 4.6% |
| Net emission to air after water scrub | 8.6% $SO_2$ | 14.4% $SO_2$ |
| % Reduction in gaseous emission | 91.4% | 85.6% |

EXAMPLE 18

The procedure of Example 12 was repeated except that the air supply was 140 percent of stoichiometric instead of 120 percent, and the roasting time was 28 hours instead of 24 hours.

Results
    Water soluble Cu — 99.4 percent
    Total Sulfur as $SO_2$ — 13.2 percent
    Total Chloride as $Cl_2$ — 12.2 percent
    Net emission to air after water scrub — 1.0% $SO_2$
    % Reduction in gaseous emission — 99.0 percent

EXAMPLE 19

The procedure of Example 12 was repeated except that the air supply was 97.3 percent of stoichiometric instead of 120 percent.

Results
    Water soluble Cu — 97.2 percent
    Total Sulfur as $SO_2$ — 3.0 percent
    Total Chloride as $Cl_2$ — 12.6 percent
    Net emission to air after water scrub — 9.6% $Cl_2$
    % Reduction in gaseous emission — 90.4 percent The results of Examples 12 – 19 are set forth in Table 3.

Results
    $SO_2$ – 25.8 percent, $Cl_2$ 1.6 percent

EXAMPLE 21

The procedure of Example 20 was repeated except that the proportions of ore and sodium chloride were 75 percent ore and 25 percent sodium chloride. Results — $SO_2$ — 11.9 percent, $Cl_2$ — 5.4 percent.

EXAMPLE 22

The procedure of Example 20 was repeated except that the proportions of ore and sodium chloride were 50 percent ore and 50 percent sodium chloride. Results – $SO_2$ — 0.3 percent, $Cl_2$ — 4.6 percent.

EXAMPLE 23

The procedure of Example 20 was repeated except that the proportions of ore and sodium chloride were 35 percent ore and 65 percent sodium chloride. Results – $SO_2$ — 0 percent, $Cl_2$ — 3.0 percent.

EXAMPLE 24

The procedure of Example 23 was repeated to corroborate the results thereof. Results – $SO_2$ — 0 percent, $Cl_2$ — 3.2 percent.

TABLE 3

CONDITIONS:
Furnace No. 1 and Furnace No. 2 — Temperature 365 – 375°C.
Charge Ratio Furnace No. 2: Furnace No. 1 — 2:1

| Example | Air Supply As % Of Stoichiometric | % Cu Extracted By Water Leach | % $SO_2$ Evolved From Furnace No. 2 | % $Cl_2$ Evolved From Furnace No. 2 | Net Emission To Atmosphere After Water Scrub - % * | % Reduction In Gaseous Emissions | Roast Time (Hrs.) |
|---|---|---|---|---|---|---|---|
| 12 | 120 | 96.4 | 12.6 | 14.8 | −2.2 | 97.8 | 24 |
| 13 | 120 | 95.7 | 14.3 | 9.7 | +4.6 | 95.4 | 24 |
| 14 | 100 | 95.3 | 12.6 | 8.0 | +4.6 | 95.4 | 20 |
| 15 | 80 | 94.5 | 15.6 | 4.7 | +10.9 | 89.1 | 16 |
| 16 | 120 | 90.0 | 17.9 | 9.3 | +8.6 | 91.4 | 24 |
| 17 | 120 | 98.5 | 19.0 | 4.6 | +14.4 | 85.6 | 24 |
| 18 | 140 | 99.4 | 13.2 | 12.2 | +1.0 | 99.0 | 28 |
| 19 | 97.3 | 97.2 | 3.0 | 12.6 | −9.6 | 90.4 | 24 |

* Positive sign is net $SO_2$, negative is $Cl_2$.

Examining the results of Examples 7—11 and 12—19, the following conclusions may be drawn:
1. In general, an air supply ranging from about 80 to about 140 percent of the stoichiometric quantity required is operable in the present process to provide water soluble copper extracts of more than 90 percent of the total copper available while effecting a reduction of at least about 86% in gaseous emissions to the atmosphere.
2. A charge ratio of 4:1 (Furnace No. 2: Furnace No. 1) provides reduced $SO_2$ evolution from Furnace No. 2 when compared with a charge ratio of 2:1.

EXAMPLE 20

Chalcopyrite ore assaying approximately 26 percent by weight of copper was admixed with sodium chloride in the ratio of 95 percent ore and 5 percent sodium chloride. A charge of 80 grams of this admixture was carried through a one cycle, two stage roasting zone process according to the procedure described in Example 7. The gases ($SO_2$ and $Cl_2$) evolved from Furnace No. 2 were absorbed in 0.5 N NaOH solution. This absorbing solution was oxidized with $H_2O_2$ and analyzed for sulfate and chloride content, and the results were calculated to $SO_2$ and $Cl_2$ (equivalent to $SO_2$) respectively.

EXAMPLE 25

To demonstrate the operability of the present process with a low grade sulfide ore, a typical low grade sulfide type copper ore was simulated by admixing 7 grams of chalcopyrite ore containing 26 percent Cu with 86 grams of monzonite (containing virtually no copper) to form an "ore" containing 1.8 grams of Cu per 93 grams of ore. This ore was admixed with sodium chloride in the ratio of 93 grams of ore and 7 grams of NaCl to give an overall copper content of 1.8 percent, and the admixture was carried through the process of this invention according to the procedure described in Example 12.

Results
    Water soluble Cu — 95.0 percent
    Total sulfur as $So_2$ – 0 percent
    Total chloride as $Cl_2$ – 15.0 percent
    Net emission to the atmosphere after scrub – 15.0 percent $Cl_2$
    % Reduction in gaseous emission – 85.0 percent.

Figure 1:
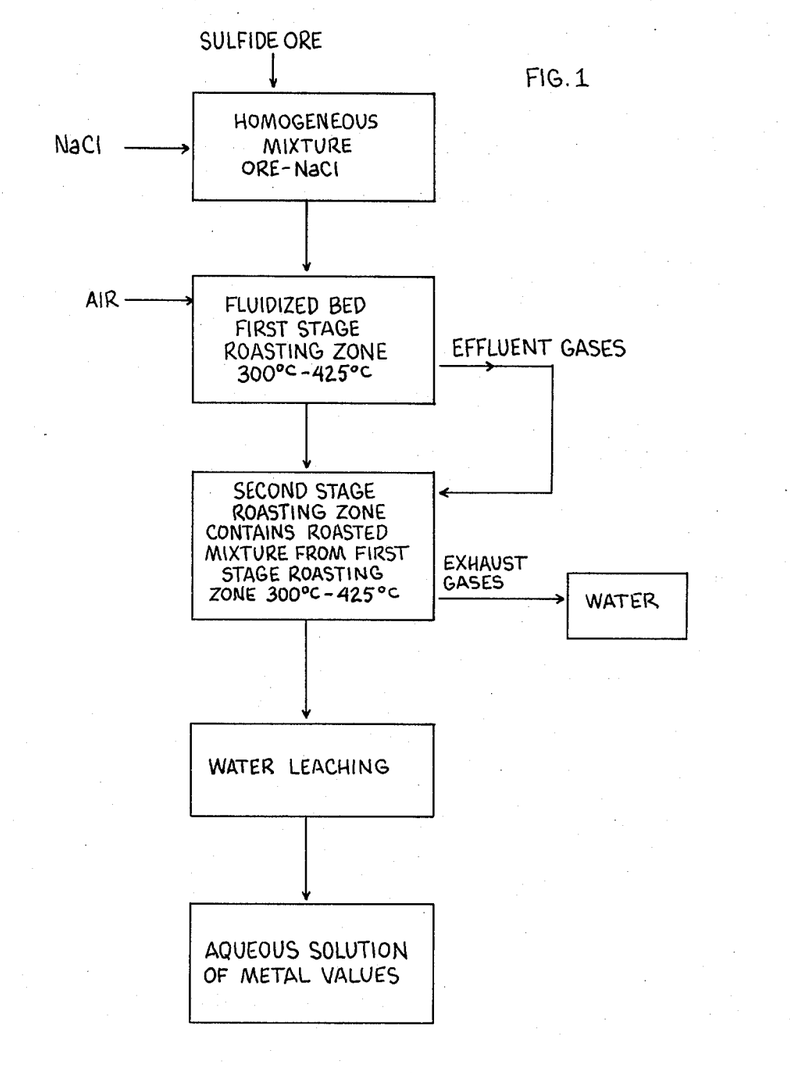
FIG. 1 a flow diagram indicative of the process of the present invention in which a fluidized bed of a mixture of ore and sodium chloride is employed.
Figure 2:
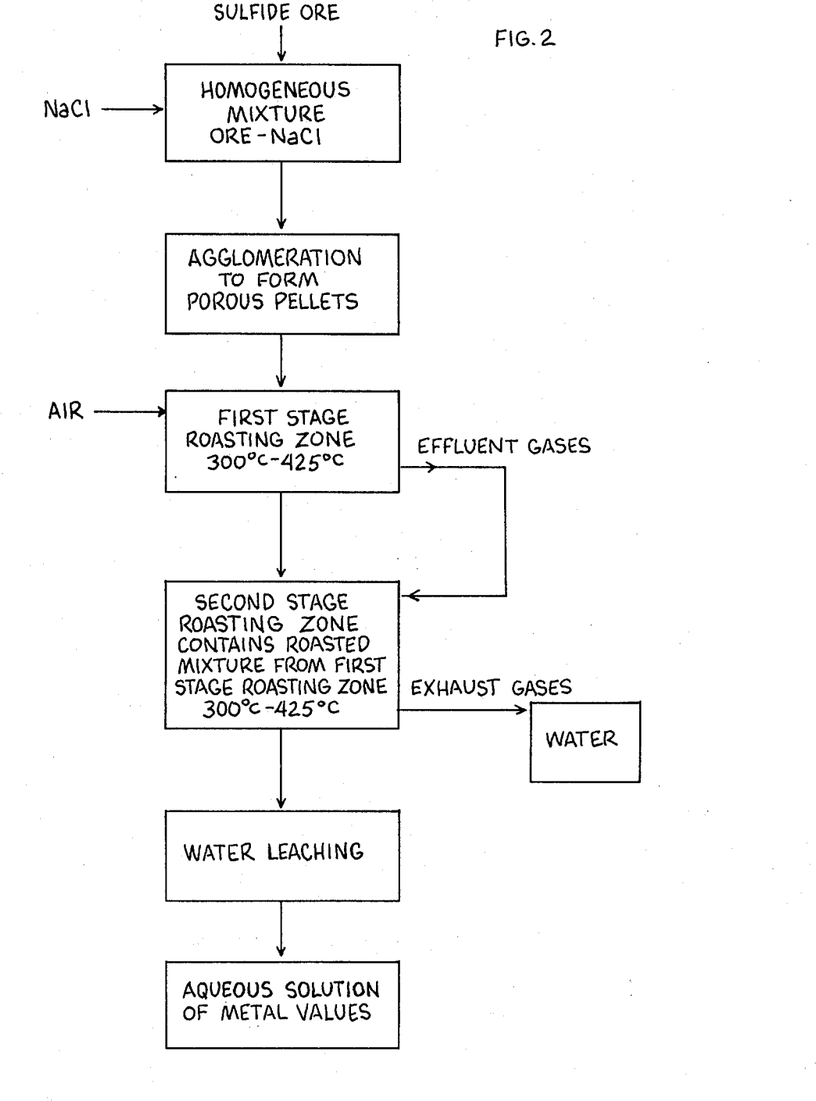
FIG. 2 is a flow diagram depicting the process of the present invention when the ore-sodium chloride admixture is agglomerated to form porous pellets and then conducted to the first stage roasting zone.
Figure 3:
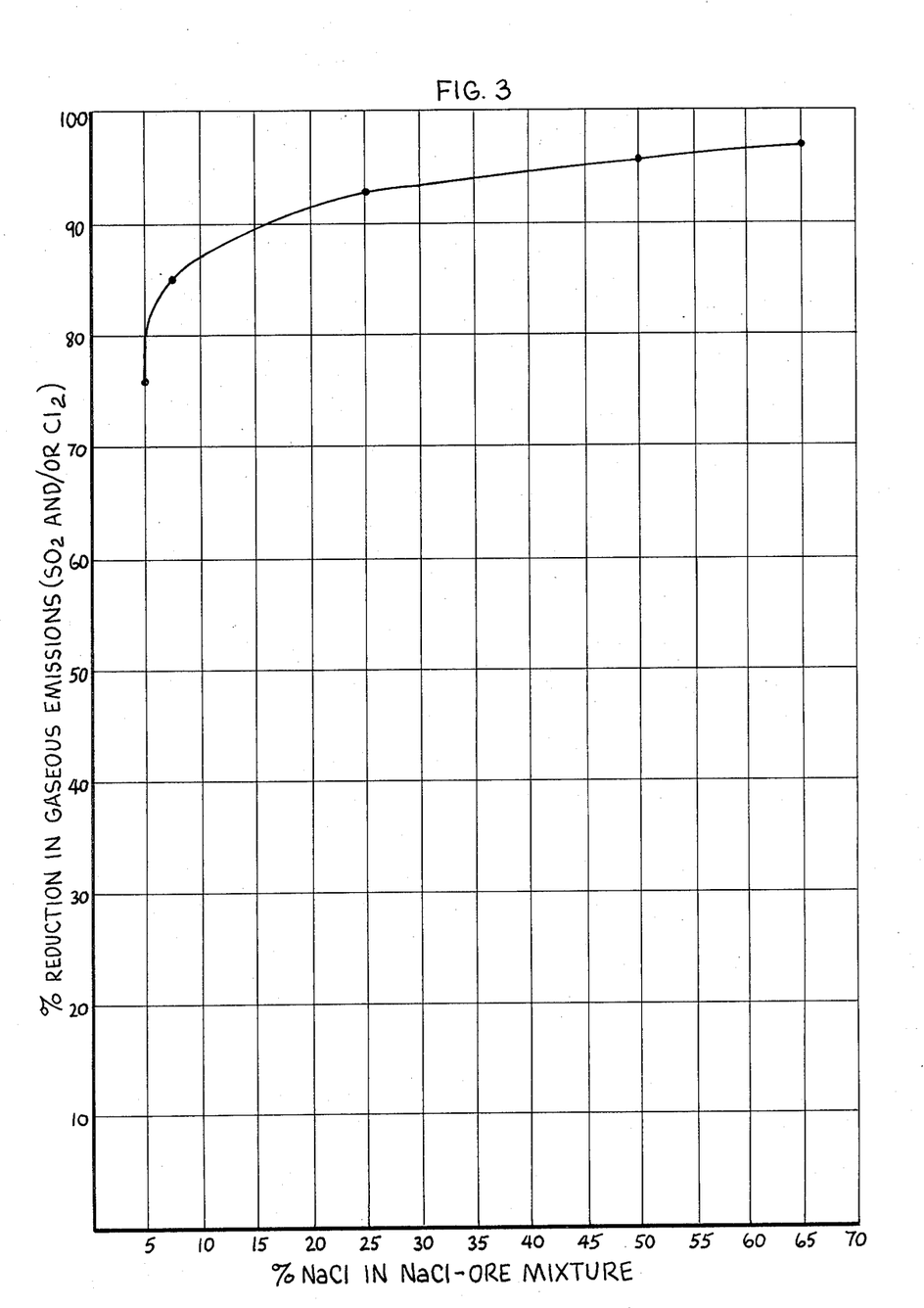
FIG. 3 is a graph depicting the percent reduction in gaseous emissions ($SO_2$ and/or $Cl_2$) as a function of the percent NaCl in admixture with the ore.

The results of Examples 20 – 25 are set forth in Table 4 and are depicted graphically in FIG. 3 where the percent reduction in gaseous emissions ($SO_2$ and/or $Cl_2$) is plotted along the ordinate and the percent NaCl in the NaCl-ore mixture is plotted along the abscissa. It is evident that an ore-sodium chloride admixture containing from about 7 to about 70 percent sodium chloride is effective in the present process to reduce gaseous emissions of $SO_2$ and/or $Cl_2$ by at least about 85 percent.

lets. The pellets were roasted at a temperature of 350°C. in the presence of convective air flow. The roasted mixture was extracted with water and the water extract was analyzed for copper content. — Result 95% Cu.

TABLE 4

| Example | % NaCl | % $SO_2$ Evolved From Furnace No. 2 | % $Cl_2$ Evolved From Furnace No. 2 | % Net Emission To Atmosphere After Water Scrub * | % Reduction In Gaseous Emissions |
|---|---|---|---|---|---|
| 20 | 5 | 25.8 | 1.6 | + 24.2 | 75.8 |
| 21 | 25 | 11.9 | 5.4 | + 6.5 | 93.5 |
| 22 | 50 | 0.3 | 4.6 | − 4.3 | 95.7 |
| 23 | 65 | 0 | 3.0 | −3.0 | 97.0 |
| 24 | 65 | 0 | 3.2 | −3.2 | 96.8 |
| 25 | 7 | 0 | 15.0 | −15.0 | 85.0 |

* - Positive Sign is $SO_2$, Negative Sign is $Cl_2$.

The results of Examples 20–24 are depicted graphically in FIG. 4 where the percent sodium chloride in the admixture is plotted along the abscissa and the percent $SO_2$ (or $Cl_2$ as $SO_2$ equivalent) is plotted along the ordinate. Curve A represents $SO_2$ emissions; Curve B represents $Cl_2$ emissions (as $SO_2$ equivalents); Curve C represents total emissions ($SO_2$ plus $Cl_2$) as $SO_2$ equivalents; and Curve D represents the net emission to the atmosphere, either $SO_2$ or $Cl_2$, after the total gaseous emissions from the process have been absorbed in water. Thus where the emission of $SO_2$ equals the emission of $Cl_2$ (as indicated at point I where Curves A and B intersect) and these gases are absorbed in water, there is zero gaseous emission to the atmosphere due to the formation of sulfuric and hydrochloric acid. This is indicated by the intersection of Curve D with the abscissa at a sodium chloride concentration of about 36 percent. Referring to Curve D, it is noted that a net emission of either $SO_2$ or $Cl_2$ of less than about 2 percent is obtained when the sodium chloride concentration is from about 32 percent to about 42 percent. At a sodium chloride concentration of from about 25 to about 70 percent the net emission to the atmosphere of either $SO_2$ or $Cl_2$ is no more than about 5 percent of the total sulfur or chloride available.

To demonstrate that porosity of the ore-sodium chloride admixture contributes to the efficiency of the present process, the following experiment was conducted.

EXAMPLE 26

An admixture containing 50 percent by weight of chalcopyrite ore concentrate (containing 26 percent copper) and 50 percent by weight of sodium chloride was pulverized to pass a 100 mesh screen. This mixture was placed in a crucible and heated at a roasting temperature of 350°C. in the presence of convective air flow. The result was a fused mass which presented a barrier to the flow of air therethrough

EXAMPLE 27

The same admixture as in Example 26 was compacted on a tabletting press to provide a tablet having enough strength to maintain its physical integrity. This tablet was roasted at a temperature of 350°C. in the presence of convective air flow. The roasted mixture was extracted with water and the water extract was analyzed for copper content. - Result — 5% Cu.

EXAMPLE 28

The same admixture as in Example 26 was moistened with water, agglomerated and formed into porous pellets. The pellets were roasted at a temperature of 350°C. in the presence of convective air flow. The roasted mixture was extracted with water and the water extract was analyzed for copper content. — Result 95% Cu.

Examples 26 – 28 illustrate the importance in the present process of gas permeability of the ore-sodium chloride mixture.

EXAMPLE 29

A mixture containing equal parts by weight of chalcopyrite ore (26% Cu content) and sodium chloride was roasted for 24 hours at a temperature of 300°C. in the presence of an air supply which was 120 percent of the stoichiometric quantity required for complete reaction. The roasted mixture was leached with water and the water extracts were combined and analyzed for copper content.

Result - Water soluble copper—95.5 percent

EXAMPLES 30–33

The procedure of Example 29 was repeated four successive times, except that the temperature of reaction was decreased each time as indicated by the following tabulation:

| Example | Temperature | Yield of Water Soluble Copper |
|---|---|---|
| 29 | 300°C. | 95.5% |
| 30 | 275°C. | 51.1% |
| 31 | 250°C. | 31.0% |
| 32 | 225°C. | 18.9% |
| 33 | 200°C. | 4.5% |

The foregoing results demonstrate that, from a practical point of view, the temperature of the reaction in the present process if preferably at least about 300°C.

EXAMPLE 34

The procedure of Example 1 was repeated except that the ore employed was a nickel-containing pyrrhotite ore instead of chalcopyrite ore. - Result - Water soluble Nickel 84.0 percent

EXAMPLE 35

To verify that $SO_2$ and $Cl_2$, when present in equimolar porportions, react with water to form an aqueous solution of $H_2SO_4$ and HCl, the following procedure was followed. A mixture of $N_2$, $SO_2$ and $Cl_2$ containing an excess of $Cl_2$ was passed through a gas dispersion tube into a vessel containing water under constant stirring. The gases evolved from this vessel were passed through a second gas dispersion tube into a solution of 1N sodium hydroxide to effect complete absorption of the effluent gases which were not absorbed in the water. No $So_2$ or $Cl_2$ was detected coming from the sodium hydroxide solution, thereby assuring that these gases were absorbed completely therein. The water absorbing solution was boiled to remove excess $Cl_2$ and then analyzed for sulfate and chloride ion content.

Results
Sulfate 7.30 g./liter, equivalent to 0.076 mole $SO_2$/liter
Chloride 5.32 g./liter, equivalent to 0.075 mole $Cl_2$/liter

EXAMPLE 36

The procedure of Example 34 was repeated except that the gas mixture contained an excess of $SO_2$ and was passed through the absorbing solutions for a longer period of time. The analysis of the water absorbing solution was as follows:
Sulfate - 13.45 g./liter, equivalent to 0.14 mole $SO_2$/liter
Chloride - 9.75 g./liter, equivalent to 0.13 mole $Cl_2$/liter The sodium hydroxide absorbing solution was also analyzed for chloride content and was found to contain only 0.014 g./liter.

The results of Examples 35 and 36 demonstrate that when $SO_2$ and $Cl_2$ gases are present in water in equimolar quantities, they react to form an aqueous solution of sulfuric and hydrochloric acids. This underscores the importance of the present process which concatenates the parameters of sodium chloride concentration, gas permeability of the sulfide ore-sodium chloride mixture, air supply, two-stage heating zone, and temperature to provide effluent gases of $SO_2$ and $Cl_2$ in essentially equimolar quantities so that they may be absorbed by water and thereby prevented from being vented to th atmosphere. The time of heating in the present process is, of course, that time which is necessary to effect completion of the reaction. As can be appreciated, this time varies according to the size of the apparatus employed, the quantities of reactants, the temperature employed, the use of a fluidized bed or porous pellets and the air supply and efficiency thereof, and is established in any particular instance by conditions of practical operation.

In general, the reaction rate, i.e., the time of reaction, is slower in the second roasting zone than in the first roasting zone. It is understood that the overall time required to effect the completion of the reaction varies with the parameters herein described and discussed, and that practical operation will establish the optimum operating times for specific ore-inorganic chloride admixtures and temperatures employed.

However, the time required for treatment in the first roasting zone is usually only that needed to effect oxidation of substantially all of the sulfur present to sulfur dioxide and/or sulfate, which in turn results in a conversion of substantially all of the metal values to the water soluble salt form. The reaction time required in the second roasting zone is that which is effective to convert to sulfate substantially all of the sulfur dioxide formed in the first roasting zone by reaction with the roasted ore-inorganic chloride admixture from the first roasting zone.

It should be noted that the overall time in the present process is therefore determined by a consideration of the quantity of material employed, by the air and gas flow through the respective roasting zones, by the temperatures therein, and by the physical state of the ore-inorganic chloride admixture.

What is claimed is:

1. A process for roasting an admixture of an inorganic chloride and a sulfide ore for subsequent extraction therefrom as water soluble salts substantially all the copper, nickel, cobalt and manganese values therein and for reducing by at least about 85 percent the emission to the atmosphere of sulfur dioxide and chlorine formed during said process without the necessity of using chemical absorbing solutions, said process comprising:

I. admixing a sulfide ore bearing said metal values with an inornganic chloride selected from the group consisting of sodium chloride, lithium chloride, potassium chloride, calcium chloride, and magnesium chloride to form a mixture containing from about 30 to about 93 weight percent of ore and from about 70 to about 7 weight percent of inorganic chloride;

II. providing a charge of said mixture in a gas permeable state to a first stage roasting zone maintained at a temperature of from about 300° C. to about 425°C. and provided with from about 80 to about 140 percent of the stoichiometric quantity of air required to react with said mixture, the quantity of air being substantially sufficient to oxidize the sulfur in the ore to the sulfate form;

III. conducting roasted mixture from said first stage roasting zone to a second stage roasting zone in which the temperature is maintained at from about 300°C. to about 425°C. while replenishing the first stage roasting zone with a fresh charge of said inorganic chloride-sulfide ore admixture;

IV conducting exhaust gases containing a mixture of sulfur dioxide, chlorine and air from said first stage roasting zone to said second stage roasting zone to convert the copper, nickel, cobalt and manganese content of said roasted mixture to the corresponding sulfate and chloride forms;

V. trapping exhaust gases containing sulfur dioxide and chlorine in substantially equimolar quantities from said second stage roasting zone in water to form an aqueous solution of sulfuric and hydrochloric acids -thereby substantially obviating their admission to the atmosphere; and VI. leaching the roasted mixture from said second stage roasting zone with water to extract therefrom substantially all of said metal values as water soluble salts.

2. The process of claim 1 wherein the inorganic chloride is sodium chloride.

3. The process of claim 1 wherein the gas permeable state of the mixture is a fluidized bed.

4. The process of claim 1 wherein the gas permeable state of the mixture consists of porous pellets.

5. The process of claim 1 wherein the ratio of the weight of roasted mixture in the second stage roasting zone to that of the first stage roasting zone is from about 1:1 to about 4:1.

6. A process for roasting an admixture of sodium chloride and a copper bearing sulfide ore for subsequent extraction therefrom as a water soluble salt substantially all of the copper value therein and for reducing by at least about 85 percent the emission to the atmosphere of sulfur doixide and chlorine formed during said process without the necessity of using chemical absorbing solutions, said process comprising:

I. admixing from about 30 to about 93 weight percent of a copper-bearing sulfide ore with from about 70 to about 7 weight percent of sodium chloride to form an ore-sodium chloride mixture, the quantity of air being substantially sufficient to oxidize the sulfur in the ore to the sulfate form;

II. forming a fluidized bed of said mixture and heating same in a first stage roasting zone at a temperature of from about 300°C. to about 425°C., said zone being provided with from about 80 to about 140 percent of the stoichiometric quantity of air required to react with said mixture;

III. conducting roasted mixture from said first stage roasting zone to a second stage roasting zone in which the temperature is maintained at from about 300°C. to about 425°C. while replenishing the first stage roasting zone with a fresh charge of said sodium chloride-sulfide ore admixture;

IV. conducting exhaust gases containing a mixture of sulfur dioxide, chlorine and air from said first stage roasting zone to said second stage roasting zone to convert the copper content of the roasted mixture in said second stage roasting zone to the sulfate and chloride forms;

V. trapping exhaust gases containing sulfur dioxide and chlorine in substantially equimolar quantities from said second stage roasting zone in water to form an aqueous solution of sulfuric and hydrochlorid acids thereby substantially obviating their admission to the atmosphere; and VI. leaching the roasted mixture from said second stage roasting zone with water to extract therefrom substantially all the copper value as a water soluble salt.

7. A process for roasting an admixture of sodium chloride and a copper bearing sulfide ore for subsequent extraction therefrom as a water soluble salt substantially all of the copper value and for reducing by at least about 85 percent the emission to the atmosphere of sulfur dioxide and chlorine formed during said process without the necessity of using chemical absorbing or chemical gas scrubbing solutions, said process comprising:

I. admixing from about 30 to about 93 weight percent of a copper-bearing sulfide ore with from about 70 to about 7 weight percent of sodium chloride to form an ore-sodium chloride mixture;

II. agglomerating said mixture to form porous pellets thereof;

III. heating a charge of said porous pellets in a first stage roasting zone at a temperature of from about 300°C. to about 425°C., said zone being provided with from about 80 to about 140 percent of the stoichiometric quantity of air required to react with said mixture, the quantity of air being substantially sufficient to oxidize the sulfur in the ore to the sulfate form;

IV. conducting roasted pellets from said first stage roasting zone to a second stage roasting zone in which the temperature is maintained at from about 300°C. to about 425°C. while replenishing the first stage roasting zone with a fresh charge of said sodium chloride-sulfide ore admixture;

V. conducting exhaust gases containing a mixture of sulfur dioxide, chlorine and air from said first stage roasting zone to said second stage roasting zone containing roasted mixture from said first stage roasting zone to convert the copper content of said roasted mixture to the sulfate and chloride forms;

VI. trapping exhaust gases containing sulfur dioxide and chlorine in substantially equimolar quantities from said second stage roasting zone in water to form an aqueous solution of sulfuric and hydrochloric acids thereby substantially obviating their admission to the atmosphere; and VII. leaching the roasted pellets from said second stage roasting zone with water to extract therefrom substantially all the copper value as a water soluble salt.

8. The process of claim 7 wherein the proportions of ore and sodium chloride are from about 25 to about 50 weight percent of ore and from about 50 to about 25 weight percent of sodium chloride, the quantity of air is from about 100 to about 120 percent of the stoichiometric quantity required, and the ratio of the quantity of roasted mixture in the second stage roasting zone to fresh ore-sodium chloride mixture in the first stage roasting zone is from about 1:1 to about 4:1.

9. A process for recovering metal values from sulfide ores which comprises:

I roasting in a first roasting zone a gas permeable admixture of from about 30 to about 93 percent of a sulfide ore containing a metal selected from the group consisting of copper, nickel, cobalt and magnanese, and from about 7 to about 70 percent of an inorganic chloride selected from the group consisting of sodium chloride, potassium chloride, lithium chloride and magnesium chloride at a temperature of from about 300°C. to the fusion point of said admixture while subjecting said admixture to a flow of air in sufficient volume to provide from about 80 to about 140 percent of the stoichiometric quantity of oxygen required to react with said admixture to oxidize same, the quantity of air being substantially sufficient to oxidize the sulfur in the ore to the sulfate form;

II. removing and passing a portion of the roasted solids from said first roasting zone to a second roasting zone maintained at a temperature of from about 300°C. to the fusion point of said roasted admixture;

III. conducting effluent gases containing a mixture of sulfur dioxide, chlorine and air from the first roasting zone to the second roasting zone and passing said gases through the roasted admixture contained therein to convert the copper, nickel, cobalt and manganese content of said roasted mixture to the sulfate and chloride forms;

IV. recovering and removing effluent gases containing sulfur dioxide and chlorine in substantially equimolar quantities from the second roasting zone and trapping said gases in water to form a solution of sulfuric and hydrochloric acids thereby substantially obviating their admission to the atmosphere; and V. removing solid roasted mixture from said second roasting zone and leaching said roasted mixture with water to recover substantially all of said metal values, said process reducing by at least about 85 percent the emission to the atmosphere of sulfur dioxide and chlorine formed during said process.

* * * * *

UNITED STATES PATENT OFFICE
CERTIFICATE OF CORRECTION

Patent No. 3,791,812     Dated February 12, 1974

Inventor(s) Robert L. Frank, Sidney G. Martin, Clayton S. Smith

It is certified that error appears in the above-identified patent and that said Letters Patent are hereby corrected as shown below:

<u>Claim 6, Subparagraph I</u> - Delete the following after the comma:

the quantity of air being substantially sufficient to oxidize the sulfur in the ore to the sulfate form <u>Claim 6, Subparagraph II</u> - Add the following after the semicolon:

the quantity of air being substantially sufficient to oxidize the sulfur in the ore to the sulfate form Signed and sealed this 21st day of May 1974.

(SEAL)
Attest:

EDWARD M. FLETCHER, JR.
Attesting Officer

C. MARSHALL DANN
Commissioner of Patents